Figure 1:
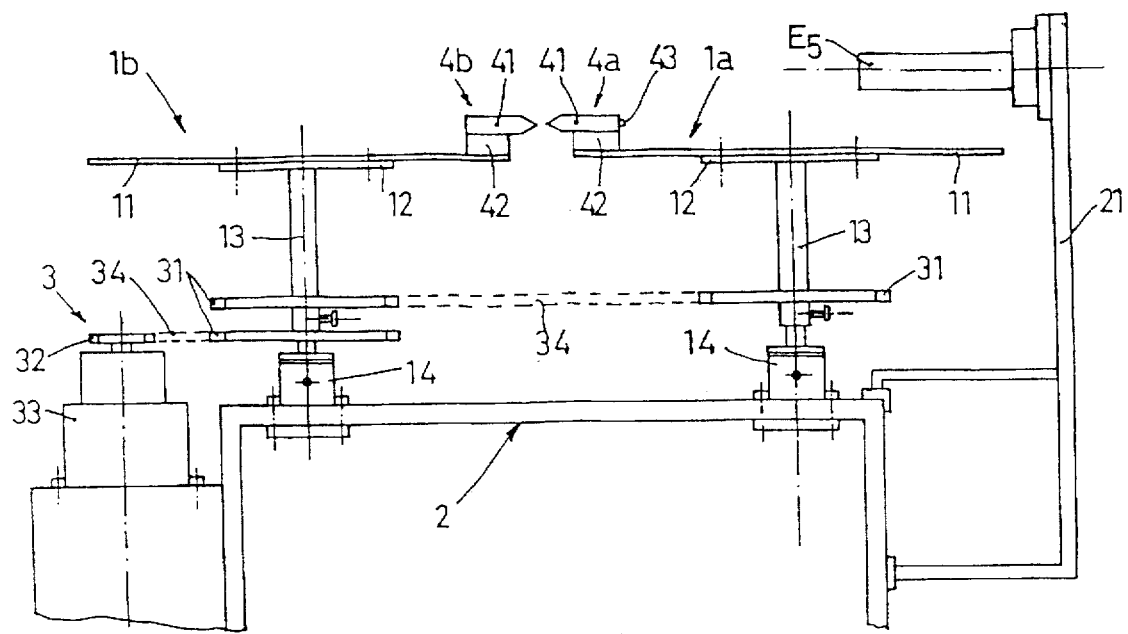

United States Patent [19]

Agote

[11] Patent Number: 5,779,530
[45] Date of Patent: Jul. 14, 1998

[54] MACHINE FOR INDUSTRIALLY CLEANING CEPHALOPODS AND SIMILAR MOLLUSKS

[75] Inventor: Iñaki Agote, Guipuzcoa, Spain

[73] Assignee: Elitxu, S.L., Spain

[21] Appl. No.: 810,299

[22] Filed: Mar. 3, 1997

[51] Int. Cl.[6] .................................................. A22C 29/04
[52] U.S. Cl. ........................................ 452/12; 452/173
[58] Field of Search ............................. 452/12, 81, 173

[56] References Cited

U.S. PATENT DOCUMENTS

| | | | |
|---|---|---|---|
| 477,134 | 6/1892 | Macqueen | 452/12 |
| 3,724,031 | 4/1973 | Sterling et al. | 452/12 |
| 3,947,921 | 4/1976 | Berk | 452/19 |
| 4,329,761 | 5/1982 | Olson | 452/108 |
| 4,710,999 | 12/1987 | Brunner et al. | 452/12 |
| 5,616,073 | 4/1997 | Curry et al. | 452/123 |

*Primary Examiner*—Willis Little
*Attorney, Agent, or Firm*—Bierman, Muserlian and Lucas

[57] ABSTRACT

Machine for industrially cleaning cephalopods and similar mollusks, which is comprised of two working platforms positioned on one same working plane and equipped with means for synchronized movement between the two; a number of loaders on each platform, which can be aligned positioned opposite one another in twos for their synchronized, cyclic shifting, each loader being capable of holding one cephalopod for cleaning; means for turning the cephalopod inside out and simultaneously turning it right side out on its transfer from a loader on the first working platform to a loader on the second working platform; and means connected to the first and second working platform for cleaning the pertinent tubular mantle and internal organs of the cephalopod while they are positioned outside thereof.

5 Claims, 2 Drawing Sheets

MACHINE FOR INDUSTRIALLY CLEANING CEPHALOPODS AND SIMILAR MOLLUSKS

This invention is that of a machine for industrially cleaning cephalopods and similar mollusks (such as squid, cuttlefish and similar mollusks).

Conventionally, cephalopods have been cleaned manually, requiring a great deal of manpower.

An attempt has been made to automate these processes through the use of apparatuses or facilities to make these cleaning tasks easier. Apparatuses are already known for mechanically cleaning mollusks, especially squid, involving a cephalopod cleaning line and a cuttlefish-rinsing line.

Currently, the mollusk-cleaning problem lies not so much in mechanically cutting off the tentacles and head, but in cleaning the mantle and the internal organs.

The machine as per this invention precisely entails automatically cleaning the mantle and internal organs of cephalopods and similar mollusks. It is structured as follows:

a) A pair of working platforms equipped with means for synchronized movement between the two;

b) a number of loaders, which can be positioned in twos facing one another on the synchronized, cyclic shift of the aforesaid working platforms, each loader being capable of holding one cephalopod for cleaning;

c) means for turning the cephalopod, that is, for turning the cephalopod inside out (like a sock), and simultaneously turning it right side out on its transfer from a loader on the first working platform to a loader on the second working platform;

d) means connected to the first and second working platforms to clean the pertinent tubular mantle and internal organs of the cephalopod whilst the same are positioned outside thereof.

On utilizing the machine entailed in this invention, one operator suffices to place cephalopods on one of the loaders for the complete cleaning inside and outside thereof. By means of prior or subsequent operations, the tentacles and head are cut off utilizing known mechanisms or alternatives.

FIG. 1 provides an overall schematic elevational view of a machine for industrially cleaning cephalopods and similar mollusks as per the invention, including the means (3) for moving the working platforms (1a), (1b) and the arm (21) of the framework structure (2) which supports the means (5) for turning cephalopods inside out, a non-restrictive example of a practical embodiment thereof.

Figure 2:
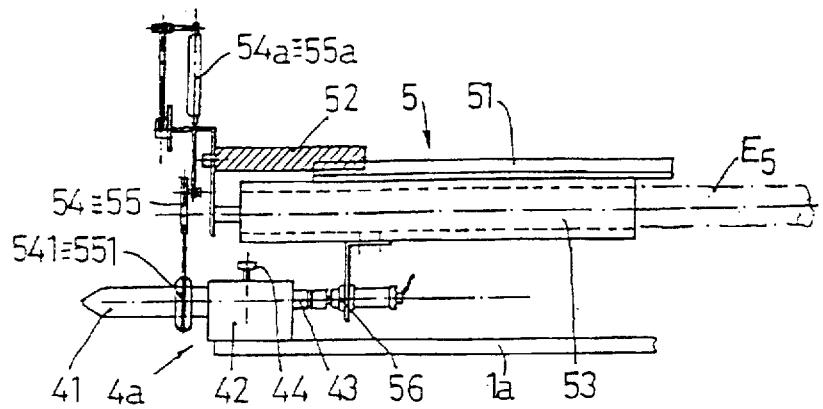

FIG. 2 provides an overall, schematic elevational view of the means (5) for turning cephalopods inside out (the outer surface being on the inside and vice versa), mounted on the arm (21) of the framework structure (2) of the machine for industrial cleaning of cephalopods and similar mollusks as per the invention, in a non-restrictive example of a practical embodiment thereof.

Figure 3:
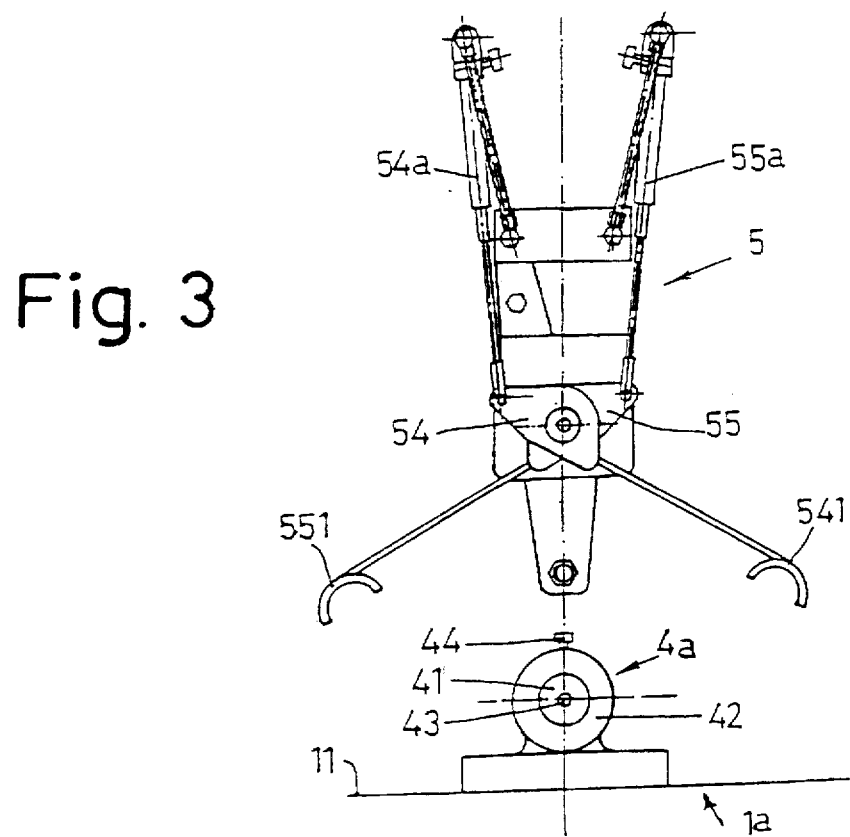

FIG. 3 provides an overall front view, in keeping with FIG. 2.

Figure 4:
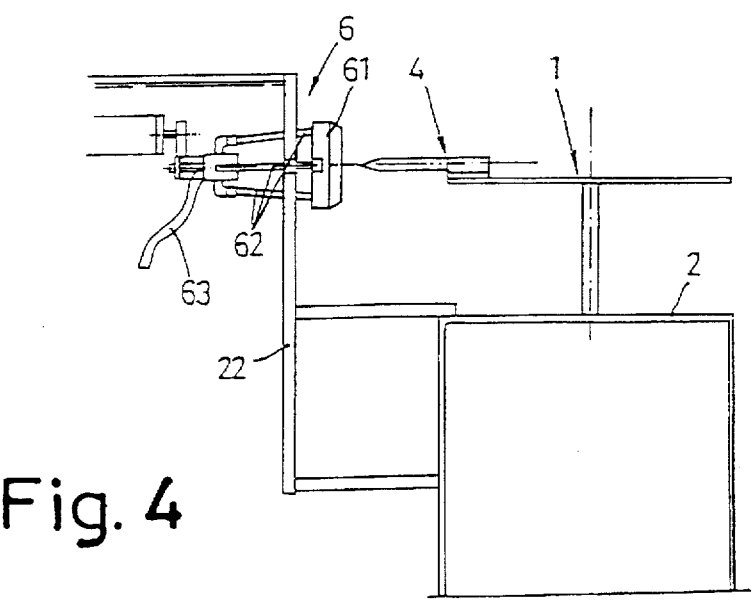

FIG. 4 provides an overall, schematic elevational view of the means (6a), (6b) for cleaning cephalopods utilizing a water jet, a minimum of one jet being mounted in a position in correlation to the area through which the loaders (4a) on the first working platform (1a) move, and a minimum of one other jet being mounted in a position in correlation to the area through which the loaders (4b) of the second working platform (1b) move.

This invention is a machine for the industrial cleaning of cephalopods and similar mollusks for carrying out said cleaning continuously in a fully-automated manner.

According to this invention, the machine for industrially cleaning cephalopods and similar mollusks entails both working platforms (1a), (1b) operatively positioned on one same plane and mounted so as to enable synchronized, cyclic shifting between said platforms, actuated by the pertinent driving means (3).

Each working platform (1a), (1b) is equipped with a number of loaders (4a), (4b) holding the cephalopods for their cleaning.

In connection with a minimum of one area of the cycle of each working platform (1a), (1b), means (6) for cleaning the cephalopods are positioned.

In connection with a minimum of one area of the work cycle, the loaders (4a), (4b) of the platforms (1a), (1b) are positioned opposite one another. In this area/these areas in which they are placed facing one another, means (5) are installed for simultaneously turning the pertinent cephalopod inside out and transferring it from a loader (4a) which shifts position in conjunction with the working platform (1a) to a loader (4b) which shifts position in conjunction with the working platform (1b).

As per the embodiment shown, the working platforms (1a), (1b) are structurally the same and are comprised of a top plate (11) and a bottom plate (12), or, were the case to be, one sole plate (11), mounted fixed on a shaft (13), which is mounted, in turn, so as to be able to turn, on a clamp (14) secured to a framework structure (2).

For cleaning several cephalopods at one time, it suffices to configure the working platforms (1a), (1b) structured lengthwise and cyclic shifting, on one or two planes, so as to operatively position several loaders (4a) mounted on the working platform (1a) opposite several loaders (4b) mounted on working platform (1b) simultaneously.

The means (3) for the synchronized, cyclic shifting of the working platforms (1a), (1b) are comprised, in the embodiment shown, of some driving gears (31) mounted on the shafts (13) and a countershaft drive gear (32) mounted on the input shaft of a motor (33) and connected to one another by means of pull chains (34). Refer to FIG. 1.

Each working platform (1a), (1b) is equipped with a number of loaders (4a), (4b) mounted on its pertinent plate (11).

The loaders (4b) of working platform (1b) are structured in the form of a hollow cone (41), particularly made of a synthetic material, mounted on the plate (11) by means of a clamp (42)—to which it is attached, for example, by means of a sap bolt (44).

The loaders (4a) of the working platform (1a) also entail an ejector (43), which is retractile by means, for example, of an internal spring, by means of which spring they tend to remain in a retracted home position.

The working platforms (1a), (1b) are positioned operatively such that in a minimum of one area of the work cycle, one or more loaders (4a) on the working platform (1a) are positioned opposite one or more loaders (4b) on the working platform (1b).

In connection with this area/these areas, the means (5) are installed for moving the cephalopods, once they have been turned inside out, from a loader (4a) on the working platform (1a) to a loader (4b) on the working platform (1b).

For the embodiment shown, the means (5) are comprised of a sliding-guide (51) mounted on the cross rail ($E_5$) of the holder arm (21), on which said sliding-guide (51) moves a support (52) in a back and forth movement, by means of a fluid-actuated cylinder (53).

Two arms (54), (55) are mounted on the support (52), revolving on a turning axis (56), each by means of the effect of the pertinent fluid-actuated cylinder (54a), (55a).

A thrusting rod (56) is also mounted on the support (52), moving on the same line in conjunction with the support.

Each hinged arm (54), (55) is equipped with a half-head (541), (551) mounted on its free end, which, acting in conjunction and in synchronization with the linear movement of the support (52), clamp the cephalopod on the loader (4a) of the first working platform (1a) and transfer it, turning it inside out, onto the loader (4b) mounted on the second working platform (1b). During this forward movement, the rod (56) also thrusts the ejector (43), overcoming the resistance offered by the spring jointly operating the front stop between loaders (4a), (4b) in order to leave the cephalopod properly turned inside out and positioned on the loader (4b) on the working platform (1b).

In connection with a minimum of one area of the working cycle of the working platforms (1a), (1b), means (6) for cleaning the cephalopod are positioned on each.

The means (6) are structured alike, comprising two systems operatively identical in their functioning. One of the systems (6a) operates to clean the outside of the cephalopod whilst the cephalopod remains on the pertinent loader (4a) of the platform (1a)—and the other system (6b) operates to clean the cephalopod also on the outside, whilst the cephalopod in question, turned inside out, remains on the loader (4b) of the platform (1b)—with which, what is now the outer surface of the cephalopod was originally its inner surface—.

Each cleaning system (6), mounted in a fixed position on another carrier arm (22), is comprised of a framework structure (61) on which a number of nozzles (62) are mounted at different angles; where each nozzle (62) is connected to a tube (63) through which pressurized water flows for cleaning the cephalopod as it moves through this area of the work cycle.

This invention includes any other structural alternatives which neither alter, change or modify the conception thereof and, in particular:

The positioning of the working platforms (1a), (1b) as being separate from one another, that is, each mounted in a fixed position without utilizing the framework structure (2) or a substitute thereof (although they must logically be kept on one same working plane);

the design concept of the working platforms (1a), (1b) in any shape, maintaining the requirement of equipping them with synchronized, cyclic shifting between the two (including by employing systems or mechanisms having independent transmissions) so that two or more loaders (4a), (4b) will be positioned opposite one another at the same time in a minimum of one area during the cycle for the purpose of carrying out the transfer of the cephalopod in the manner described;

the inclusion of more than one area of transfer; more than one cleaning area on each platform (1a), (1b) and more than one cephalopod loading/unloading station, within one same work cycle, for the purpose of improving the output or productivity of the facility;

the inclusion of a different number and/or positioning of the cleaning jets (62), arranged in a regular pattern (same angle of separation between jets) or in an irregular pattern (different angles of separation between every two adjacent jets).

I claim:

1. A machine for industrially cleaning cephalopods and similar mollusks comprised of:

a) a pair of working platforms, each of the working platforms being positioned on one same working plane and equipped with means for synchronized shifting between the two thereof;

b) a plurality of loaders, each of said loaders being positioned opposite one another in pairs during the synchronized, cyclic shifting of said working platforms, each loader further being capable of holding one cephalopod for cleaning;

c) means for turning the cephalopod inside out and simultaneously turning it right side out while it is being transferred from a loader on the first working platform to a loader on the second working platform;

d) means in connection with the first and second working platforms for cleaning the pertinent tubular mantle and internal organs of the cephalopod whilst they are positioned outside thereof.

2. The machine for industrially cleaning cephalopods and similar mollusks as set forth in claim 1, wherein the means for the cyclic shifting of the working platforms are transfer-shifting transmission systems, said transmission systems comprised of sets of gears mounted on a live axle of the pertinent working platform; each one of the two platforms being connected to one another by means of pull chains, as well as a minimum of one thereof being connected with a gear mounted on a motor input shaft; and sensors for detecting the position of the loaders synchronized by a robot.

3. The machine for industrially cleaning cephalopods and similar mollusks as set forth in claim 1, wherein each cephalopod-holding loader is structured in the form of a hollow cone mounted in a fixed position radially on the pertinent working platform; each of the hollow cones being equipped with a retractile ejector which can be operated simultaneously by the means which turn the cephalopod inside out, both jointly operating to achieve the automatic positioning thereof on the pertinent loader mounted on the second working platform.

4. A machine for industrially cleaning cephalopods and similar mollusks as set forth in claim 1, wherein the means for turning the cephalopod inside out at the same time as it is being transferred from a loader on the first working platform to a loader on the second working platform is comprised of:

a) a support which can be moved in a guided manner on a slide by the action of a fluid-actuated cylinder;

b) the support having two arms mounted thereon, each of the arms revolving around a turning axis fixed to said support, the revolving being actuated by fluid-actuated cyclinders, each arm being equipped with a half-head;

c) a rod which is mounted on the support and which is equipped to shift position in conjunction with the support, the rod actuating the pertinent ejector on its forward movement, and the half-head of each arm acting in conjunction and in synchronization with the linear movement of the support, grasp the cephalopod on the loader of the first working platform and turn it inside out, positioning the cephalopod on the loader of the second working platform, against which it butts head-to-head by means of the action of the ejector.

5. A machine for industrially cleaning cephalopods and similar mollusks as set forth in claim 1, wherein the cleaning means is comprised of a plurality of cleaning jets which spray pressurized water to clean the outside of the cephalopods positioned on the pertinent loaders.

* * * * *